July 16, 1935.  C. L. JONES  2,008,306
METHOD AND APPARATUS FOR PROTECTING ARTICLES DURING A TUMBLING OPERATION
Filed April 4, 1934
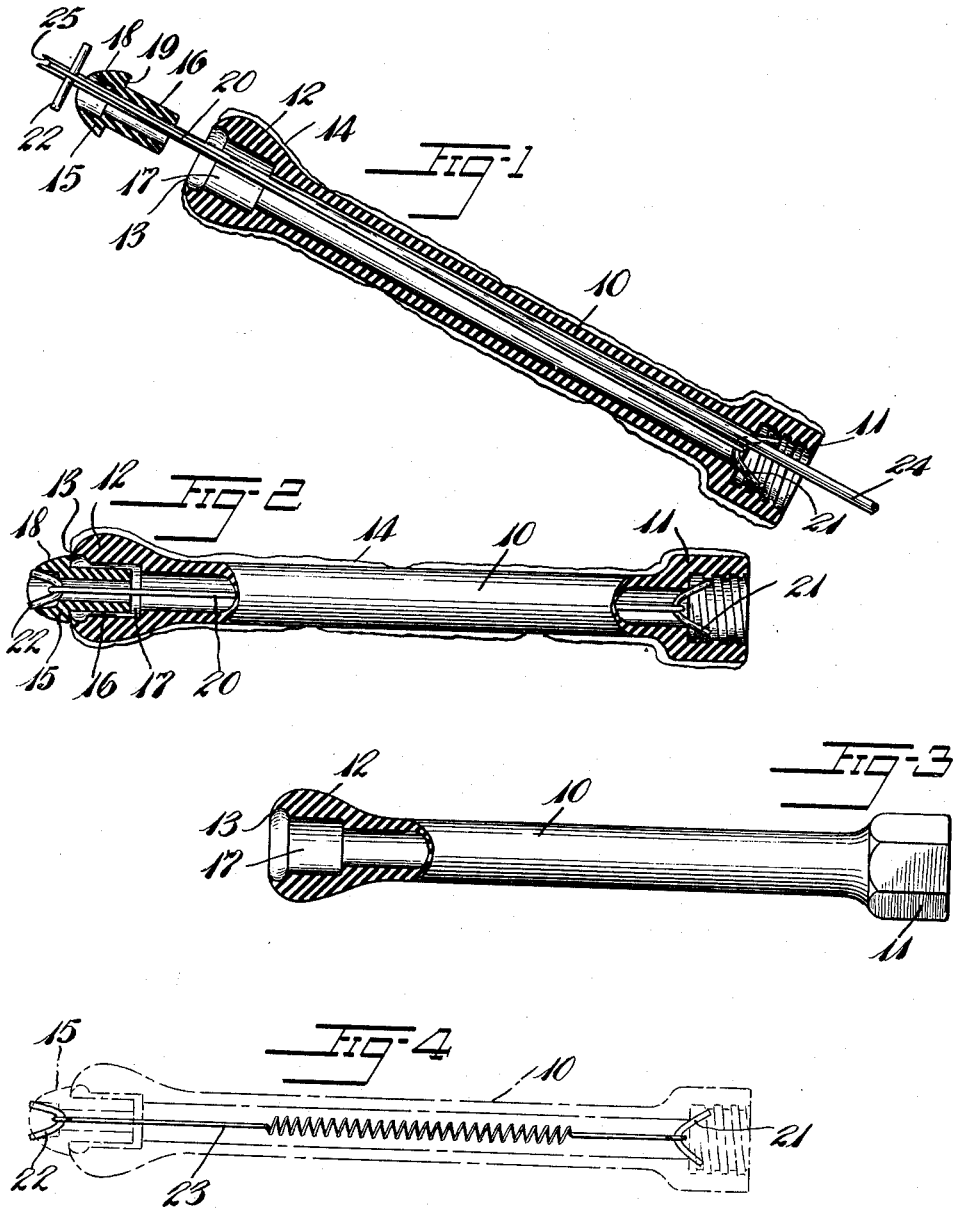
Inventor
Clarence L. Jones
By Eakin & Avery
Attys.

Patented July 16, 1935

2,008,306

UNITED STATES PATENT OFFICE 2,008,306

METHOD AND APPARATUS FOR PROTECTING ARTICLES DURING A TUMBLING OPERATION

Clarence L. Jones, Akron, Ohio, assignor to The B. F. Goodrich Company, New York, N. Y., a corporation of New York Application April 4, 1934, Serial No. 718,940

2 Claims. (Cl. 51—274)

This invention relates to a method and apparatus for protecting articles while the articles are subjected to a tumbling operation.

In the manufacture of molded articles of hardening plastic material a rhind or fin is formed on the articles at the parting of the mold. Other surface imperfections are often present due to blistering of the material or dirt in the mold. All such imperfections must be removed by abrasion and it is customary to remove these by abraiding wheels, the articles being manipulated over the face of the wheels by hand.

When the articles have no edges which must remain sharp, this work may be facilitated by tumbling the articles with an abrasive but such tumbling tends to round all sharp corners.

The principal object of the present invention is to provide an apparatus and procedure whereby the sharp edges of certain articles may be protected from abrasion while the articles are subjected to a tumbling operation.

Other objects will appear from the following description and the accompanying drawing.

In the drawing:

Fig. 1 is a sectional view of a tubular article and the protective device showing a tool in position to aid in assembling the protective device and the article, the protective device being shown in its preferred form.

Fig. 2 is a view, partly in longitudinal section, of the same article with the protective device in place.

Fig. 3 is a view, partly in longitudinal section showing the finished article with the protective device removed.

Fig. 4 is a diagrammatic view similar to Fig. 2 showing the article and protective device in dot and dash lines and a modified form of holding means in full lines.

Referring to the drawing, the numeral 10 designates a molded hard rubber syringe pipe, which is shown as an example of an article in the manufacture of which the invention may be used. This pipe is a tubular article having an internally threaded enlarged socket 11 at one end and a bulbous portion 12 terminating in a sharp edge 13 at the other end. The edge 13 must be protected from abrasion during the tumbling process.

The numeral 14 indicates the flash, rhind, or fin which is to be removed by abrasion.

In order to protect the edge 13 from abrasion, I provide a soft rubber bushing 15 having a reduced portion 16 which enters the bore 17 of the article and an enlarged portion 18 terminating at a shoulder 19 which seats upon and covers the edge 13.

In order to hold the bushing 15 in position a tension member 20 preferably comprising a rubber band is passed through the bore of the article and the protective bushing 15, being retained at one end by a U-shaped wire staple 21, which can enter the threaded portion 11 of the article but cannot pass through the bore of the tube, and at the other end by a rod 22 of semi-hard rubber which is bent to U-shape by the tension of the band but is too rigid to pass through the soft rubber bushing 15. Where it is desired, the rubber band may be replaced by a tension member 23 of spring wire as shown in Fig. 4. The parts 15 and 22 which project beyond the article, being made of relatively soft rubber, will not injure the surfaces of adjacent articles when the articles equipped with protection devices are subjected to the tumbling operation and the part 21 does not project beyond the article.

In order to assemble the parts of the protective device and the article, use may be made of a wire or rod 24 having a notch 25 in its end. The rubber band 20 or the end of the spring 23 is hooked over the notch 25 and passed through the article while the other end of the band or spring is retained by the staple 21, the bushing 15 may then be passed over the notched end of the rod 24 and the rod 22 passed through the loop in the band or spring. The rod 24 may then be withdrawn.

After a quantity of the articles have had the protective devices applied thereto, they are placed in a tumbling barrel with suitable abrasive material and tumbled. Thereafter the protective devices are removed from the articles.

I claim:

1. Apparatus for protecting the end of a rigid tubular article during a tumbling operation, said apparatus comprising a soft rubber guard for covering the end of the article to be protected, and means engageable with the bore of the article to retain the guard in position.

2. Apparatus for protecting the end of a rigid tubular article during a tumbling operation, said apparatus comprising a soft rubber guard for engaging the end of the article to be protected, an anchoring member engageable with the opposite end of the article, and a tension member extending through the article and engaging the anchoring member and guard.

CLARENCE L. JONES.